United States Patent [19]

Ersoy et al.

[11] 4,410,295
[45] Oct. 18, 1983

[54] UNIVERSAL JOINT CONSTRUCTION

[75] Inventors: Metin Ersoy, Hilchenbach; Hermann J. Krämer, Wilnsdorf, both of Fed. Rep. of Germany

[73] Assignee: Lemförder Metallwaren AG Lemförde, Fed. Rep. of Germany

[21] Appl. No.: 344,039

[22] Filed: Jan. 29, 1982

[30] Foreign Application Priority Data

May 2, 1981 [DE] Fed. Rep. of Germany ....... 3103954

[51] Int. Cl.$^3$ .................. F16C 11/00; F16D 1/12
[52] U.S. Cl. .................... 403/122; 403/133; 403/135; 384/421; 29/418; 29/453
[58] Field of Search ............... 403/122, 132, 133, 135, 403/140, 2, 11, 56, 76, 77, 90; 29/441, 453, 149.5 B, 416, 418; 384/421, 129

[56] References Cited

U.S. PATENT DOCUMENTS

| | | | |
|---|---|---|---|
| 2,910,260 | 10/1959 | Tanner | 403/76 X |
| 3,348,864 | 10/1967 | Ulderup | 403/77 |
| 3,389,926 | 6/1968 | Gottschald | 403/77 X |
| 3,594,898 | 7/1971 | Lewandowski | 29/418 X |
| 3,749,431 | 7/1973 | Schmid et al. | 403/76 |
| 3,787,127 | 1/1974 | Cutler | 403/140 X |
| 4,266,883 | 5/1981 | Riester et al. | 403/76 X |

Primary Examiner—Wayne L. Shedd
Attorney, Agent, or Firm—McGlew and Tuttle

[57] ABSTRACT

A universal joint construction comprises a plastic housing casing portion which includes an interior cavity forming a ball receiving socket which has an opening in a wall bounding the opening exteriorally of the socket which is bevelled outwardly to an end from the socket. The exterior of the wall is bevelled outwardly in a direction toward the socket. The exterior of the housing casing has an annular groove around the socket which is adjacent to the wall. A ring portion is advantageously formed integral with and connected to the casing by a connecting web of slight thickness. The ring portion has a bore with a radially inwardly extending collar of a diameter to engage over the bevelled wall and be advanced over the bevelled portion of the wall to cause the inward deflection of the wall so as to permit the collar to move beyond the bevelled wall and engage in the groove.

6 Claims, 2 Drawing Figures

UNIVERSAL JOINT CONSTRUCTION

FIELD AND BACKGROUND OF THE INVENTION

This invention relates in general to the construction of so called ball and socket joints and in particular to a new and useful universal joint having a plastic housing with a socket for receiving a ball joint which is reinforced by a ring engageable over the housing and into a groove defined on the exterior of the housing.

Ball and socket joints are employed in a variety of applications which all have in common that by means of the joint, forces are to be transmitted. Depending on the magnitude of these forces, various materials are used. With very strong forces, both the ball and the socket are made of a metal. With smaller forces, plastic sockets have already been used (German utility model No. 1826871) which are inserted in a metallic casing and have a slotted rim portion which can be radially squeezed by means of a ring screwed into the metallic casing and provided with a conical inner clamping surface, to obtain a certain tightness in motion. Such a design requires not only a plastic socket within the metallic casing, but also threads in the casing and on the ring. In instances where no adjustment is needed, this design is too expensive. With still smaller forces to be transmitted, purely plastic casings have already been provided (German utility model No. 1948987). Such casings are slotted and, upon forcing the ball end therein, they are clamped by a fastening spring bridging the slot. Such a construction has the disadvantage that the socket must be designed so to speak as a fork, i.e., with a slot extending far to the interior, through which dirt may easily penetrate into the joint. In addition, the mounting of the fastening spring is relatively expensive and can hardly be done without manual work.

Labor costs may certainly be reduced with a design according to German Pat. No. 1921769. However, there the socket has also the shape of a fork and the prong portions are connectable to each other by an engageable locking cap flexibly hinged thereto. This again involves a high risk of soiling. Moreover, there is a change of an inadvertent unlocking of the cap. Soiling seems to be better avoided in a joint in accordance with German utility model No. 1696024 where a closed plastic socket is provided. A metallic reinforcement comprising at least two different parts, namely a metal strip and a metal sleeve, is intended to increase the strength. These parts, however, involve further expenses and require several additional mounting steps. Further known is a spherical joint disclosed in German OS No. 28 42 800, comprising a socket and a fastening spring embracing the socket and projecting by its ends through slots to the interior. The fastening spring certainly is capable of preventing a ball end from slipping out, however, the spring ends at the ball end contact each other only after a considerable play. Also, the mounting of such a fastening spring is expensive.

The invention is directed to a design of a joint of the above-mentioned kind requiring only a small number of parts, being easy to assemble manually or mechanically, and, in addition, simplifying the preparatory work for the assemblage. The joint is to be inexpensive, suitable for a series manufacture, and have a long life substantially requiring no maintenance. Any play is substantially to be eliminated, and the risk of soiling should be minimized.

In accordance with the invention a universal joint is provided with a plastic housing which includes a socket having an opening through which a ball of a joint member is positioned and which includes a bevelled wall bounding the opening which is bevelled outwardly away from the socket and which has an exterior which is bevelled outwardly in a direction toward the socket. Beyond the exterior bevelled wall the housing is provided with a groove and this groove is engaged by a collar portion of a ring member which may be slid upwardly along the bevelled wall to compress the bevelled wall inwardly and permit the collar to engage in the groove.

The advantage of such an arrangement is that no screwing is provided and no springs, fitting strips, etc. are to be hinged, attached, passed through, or bent in. What is needed to accomplish the assembly are merely two straight pushes in the axial direction. The first push brings the ball end into engagement with the socket, and the second push makes the ring slip over the rim into locking position. The assemblage is further facilitated by forming the casing and the ring in the same mold and maintaining a connection between the casing and the ring at least up to the instant of accomplishing the assemblage proper. Then, there is no need for separately bringing the ring into an assembled position, it is undetachably linked to the casing, in a position ready for mounting. Even if a slotted rim would be provided to further facilitate an engagement thereover, this will not increase the risk of soiling, since the ring will substantially completely cover the slots.

Accordingly, it is an object of the invention to provide a universal joint construction which comprises a plastic housing casing portion including an interior cavity forming a ball receiving socket which has an opening for the insertion of a ball head of a pin joint which includes a wall bounding the opening which is bevelled outwardly to an end from the socket on its interior and bevelled from the outer end outwardly toward the socket on its exterior, the exterior wall of the casing portion including an annular groove which is engageable by a collar of the ring member which slides over the bevelled wall and compresses this wall inwardly when the ring member is energized in the groove.

A further object of the invention is to provide a universal joint construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
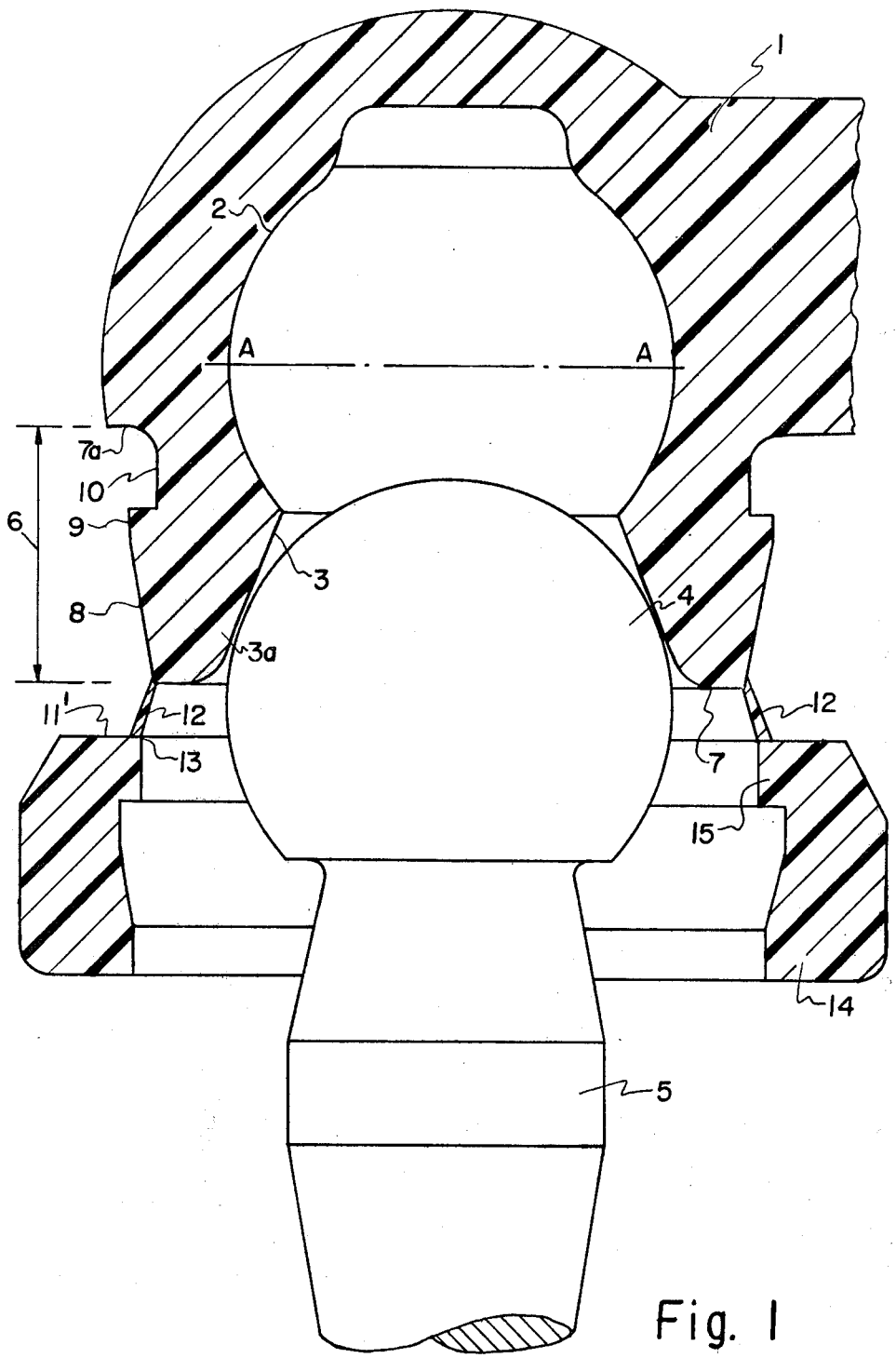
FIG. 1 is a sectional view of a casing assembly constructed in accordance with the invention before complete engagement with a pin joint.
Figure 2:
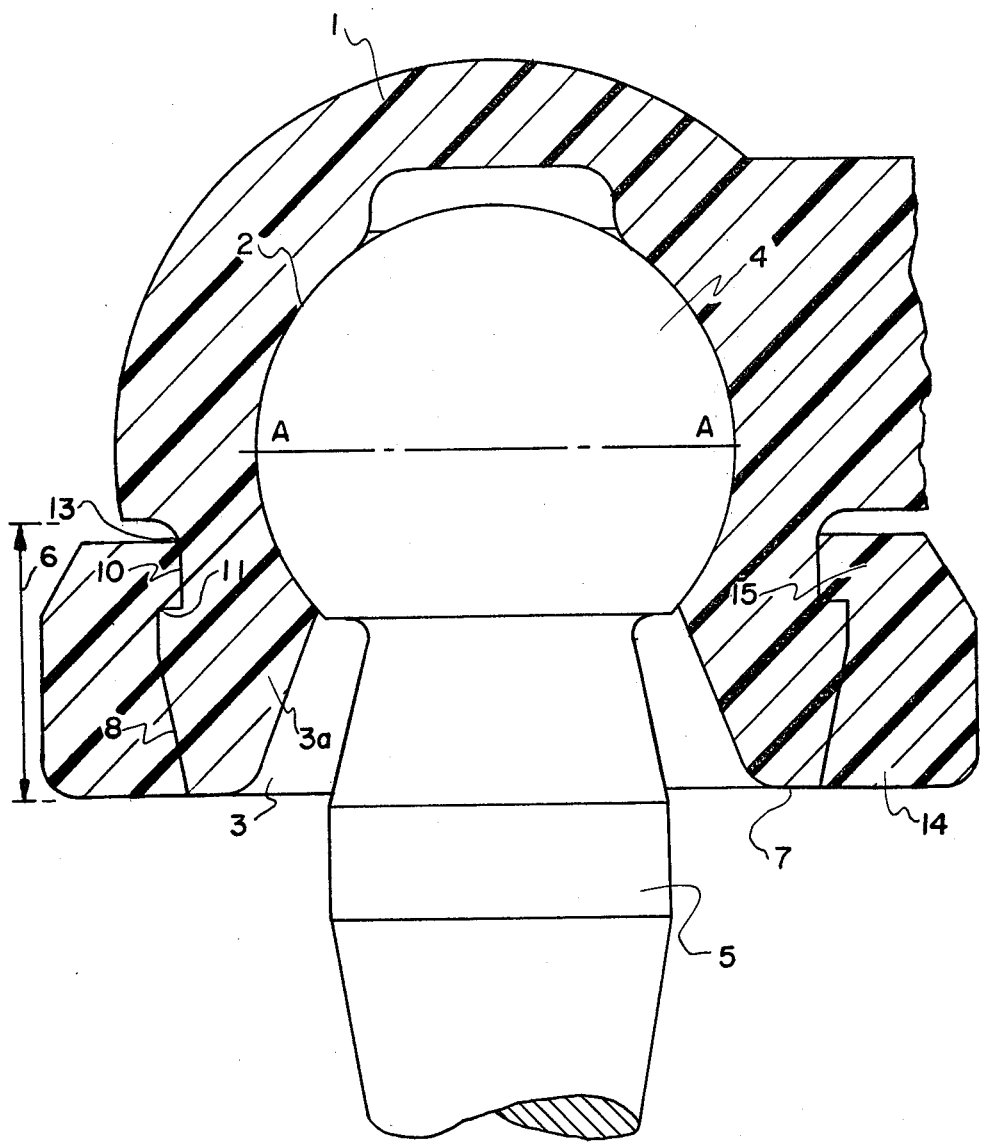
FIG. 2 is a view similar to FIG. 1 showing the pin joint full connected in the casing reinforced by a ring portion thereof.

Referring to the drawings in particular the invention embodied therein, comprises a universal or ball and socket joint which includes a casing portion 1 having an interior socket 2 for receiving a ball end of a shank 5 of a pin joint which is moved upwardly into the casing through an opening 3 which is bounded by a bevelled wall 3a. The bevel on the interior of the wall 3a is in a direction outwardly from the socket and on its exterior it is in a direction outwardly from the end of the casing toward the socket. In accordance with the invention a ring member 14 is advantageously formed integrally with, and united to the casing portion 1 by a connecting web 12 of slight thickness and it has an upper edge 11.

In a casing 1 made completely of a plastic, a cavity forming a socket 2 is provided having a spherical shape up to beyond an equatorial plane A—A . This socket cavity 2 terminates in a central opening 3 of casing 1 which has a wall 3a which flares conically outwardly up to the outer surface of the casing and terminates in an opening 3. Opening 3 is dimensioned to allow, upon elastic enlargement, the introduction of the ball end 4 of a shaft, pin, or shank 5. The casing portion surrounding opening 3 and part of the socket 2 is termed a rim zone 6, which includes an edge portion 7 up to an edge 7a. The outer surface 8 of the rim zone extends conically in the direction of equatorial plane A—A, with the diameter of this surface enlarging in that direction. In the same direction, the conical surface 8 is followed by a cylindrical portion 9, and adjacent thereto, a circular groove 10 is provided which extends parallel to equatorial plane A—A. A thin, foil-like connecting film 12 is formed which extends from edge 7 of casing 1 up to an edge 13 of a ring 14, and is integral with both the casing 1 and the ring 14. Ring 14 is designed with an inside contour substantially corresponding to the outer contour of rim zone 6. More particularly, ring 14 is formed with an inwardly projecting circular collar 15. Ring 14, being linked to the casing, approximately occupies a position parallel to equatoriall plane A—A.

Starting from the position of parts as shown in FIG. 1, the joint is assembled as follows: first, ball end 4 is moved, manually or by a tool, in the direction of socket 2. This makes rim zone 6 expand elastically outwardly. Depending on the size of the joint (small-size joints have a ball end diameter between 5 and 10 millimeters, for example), it may be advisable to provide a slightly slotted rim zone 6. After pushing through a certain distance, ball end 4 snaps into the socket 2 and rim zone 6 springs back. Now, if the ring 14 is pushed in the same direction, edge 13 passes over lower edge 11 of groove 10 and slides on conical surface 8 which is thereby slightly pressed radially inwardly. Starting from a certain instant, ring 14 is elastically expanded, which particularly applied to collar 15. Ring 14 then passes over portion 9 to cause collar 15 to snap into the groove 10.

A removal of ball end 4 from socket 2 is now safely prevented. The spherical joint operates substantially without play. An unintentional disengagement of ring 14 is not possible. Penetration of dirt is effectively checked even if the rim zone 6 is slotted, since such slots are virtually closed by ring 14. Instead of a connecting film 12, small webs may be provided. It is also possible to provide tear-off lines in the web, which should be located near the edge 13. A jamming in the gap forming during the engagement of ring 14 can thus be avoided.

While specific embodiments of the invention have been shown and described in detail to illustrate the application of the principles of the invention, it will be understood that the invention may be embodied otherwise without departing from such principles.

What is claimed is:

1. A universal joint construction, comprising a plastic housing casing portion including an interior cavity forming a ball receiving socket having an opening that receives a ball member with a wall bounding the opening which is bevelled outwardly to an end from said socket on its interior and has an exterior which is bevelled outwardly from said end in the direction towards said socket, the exterior of said housing casing having an annular groove around said socket adjacent said exterior of said wall, a frangibly connected ring portion having a bore with a radially inwardly extending collar of a diameter that engages over said wall and is advanced over said bevelled exterior of said wall and deflects said wall inwardly and establishes engagement of said collar in said groove, with said ring reinforcing side wall.

2. A universal joint construction according to claim 1, wherein said casing portion of said ring portion are formed as an integral part interconnected with each other.

3. A universal joint construction according to claim 1, wherein said socket has a center through which an equatorial plane, passes said ring being connected to said housing portion and being held by said connection in a position parallel to said equatorial plane.

4. A universal joint construction according to claim 1, wherein said exterior of said wall portion tapers conically and continuously enlarges in a direction toward said socket from the edge of said casing portion, said edge of said casing portion being of a diameter which is slightly smaller than the smallest inside diameter of said ring.

5. A universal joint construction according to claim 4, wherein said housing portion includes a cylindrical portion between said exterior wall portion and said groove.

6. A universal joint according to claim 5, wherein said ring includes an interor bore tapered toward said cylindrical portion and said exterior tapered wall portion so that said wall portion fits snugly within said ring and is reinforced thereby.

* * * * *